Jan. 5, 1937.  C. C. MOFFATT  2,067,061
HEAT TREATMENT OF COMPOSITE BEARINGS
Filed May 18, 1936
FIG.I.
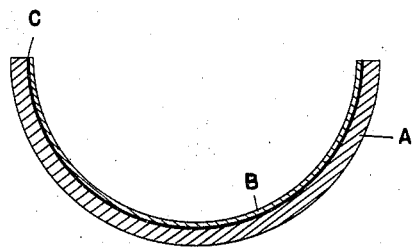
FIG.2.
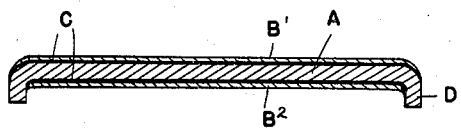
INVENTOR
CHESTER C. MOFFATT
BY
ATTORNEYS Patented Jan. 5, 1937

2,067,061

UNITED STATES PATENT OFFICE 2,067,061

HEAT TREATMENT OF COMPOSITE BEARINGS

Chester C. Moffatt, Detroit, Mich., assignor to Bohn Aluminum & Brass Corporation, Detroit, Mich., a corporation of Michigan Application May 18, 1936, Serial No. 80,464

5 Claims. (Cl. 148—13)

The invention relates to bearings of that type comprising a bearing surface or lining formed of a lead base alloy and a reinforcing shell on which this lining is mounted. It is the object of the invention to obtain a bearing having improved characteristics with particular reference first, to the wearing quality of the lining forming the bearing surface; second, as to the strength of bond between the lining and the shell; third, as to resistance to fatigue. With this object in view the invention consists first, in a bearing having improved characteristics; and second, in the process through which these improved characteristics are attained.

In the drawing:

Figure 1 is a cross-section through a half-bearing of my improved construction;

Figure 2 is a longitudinal section thereof slightly modified.

As above stated, my improved bearing comprises a reinforcing shell of any suitable construction, but preferably of steel, and a lining formed of a lead base alloy. This lining comprises essentially a composition of tin, antimony and lead, in which the tin is the bonding element. The improved characteristics of the bearing are not, however, due solely either to the structure or to the specific composition of the lining, but are chiefly due to the heat-treatment to which the bearings are subjected after the original formation of the same.

The lead base alloy contains essentially from 1 to 15% tin, from 5 to 20% antimony and the balance mainly of lead. Other materials may be added thereto to obtain certain desirable characteristics, such as copper, graphite and arsenic. Certain specific formulas which have been used by me are as follows:

| 1. | Per cent |
|---|---|
| Copper | .15– .65 |
| Tin | 8.25–11.50 |
| Antimony | 11.50–17.00 |
| Lead | 70.00–79.00 |
| Arsenic | .10– .40 |
| Graphite | .04– .20 |

| 2. | Per cent |
|---|---|
| Copper | .30 – .75 |
| Tin | 8.50 –10.5 |
| Antimony | 11.25 –15.25 |
| Lead | 73.00 –79.00 |
| Arsenic | .025– .10 |
| Graphite | .04 – .10 |

| 3. | Per cent |
|---|---|
| Copper | .10– .98 |
| Tin | 7.00– 8.00 |
| Antimony | 9.50–11.50 |
| Lead | 80.00–85.00 |
| Arsenic | .50 |
| Graphite | .05– .10 |

The function of the tin is to strengthen the bonding quality of the alloy; the arsenic is a hardening agent; the graphite improves the antifriction character of the bearing surface; and the antimony resists attack by acids developed in the use of certain lubricating oils.

In the forming of the bearing the steel shell such as A, Figure 1, has cast thereto the lining B which is bonded to the shell by a suitable material indicated at C. This bonding material may be either substantially pure tin or an alloy of tin and lead or cadmium-nickel alloy, or any other suitable material. For certain types of bearings, the shell A is provided with flanges D, as shown in Figure 2, and the bearing surface may either be on a single side of the shell or as indicated on the opposite sides at B' and B², Figure 2.

After the bearing has been formed as above described, it is subjected to a heat treatment which produces a marked change in certain of its physical characteristics. This heat treatment preferably is accomplished by immersing the bearing in an oil bath held in a suitable container and then heating the oil, as for instance by placing the container within a thermostatically controlled electric furnace. The temperature is maintained at from 300° to 350° F. and for a period of time from 3 to 6 hours. At the end of the heating period the container is removed from the furnace, but the bearing is still permitted to remain in the oil until cooled down to normal temperature.

The improved characteristics of the heat-treated bearing are best shown by the following report of comparative tests that have been made of single half bearing structures lined with the bearing alloys specifically set forth herein heat-treated, and such structures without heat treatment.

Bond tests

Bearings, treated and untreated, semi-circular in shape, were flattened out under pressure until comparatively straight. The heat-treated bearings showed no cracking of the bearing metal and no separation of the bearing metal from the steel shell after the flattening, while the untreated bearings showed cracks in the bearing metal and separation of the bearing metal away from the steel shell, after flattening.

Similar results were obtained using flanged bearing shells or unflanged bearing shells, varying the composition of the bearing metal within the limits described, and using bonding metals of different compositions. In every case, the heat-treated bearings subjected to bond tests as described, showed no cracks in the bearing metal lining or separation of the bearing metal lining from the steel shell, while the unheat-treated bearings showed cracking and separation of the lining from the shell, indicating improvement in physical characteristics solely through the heat treatment.

*Bearing wear tests*

Bearings, treated and untreated, were subjected to tests in a bearing wear test machine in which bearings are run under conditions approximating actual operating conditions, by means of a shaft revolving inside of bearings mounted in connecting rods, under adjustable speeds, bearing pressures, and temperatures.

Bearings under test are run in at normal speeds and pressures and are finally subjected to abnormal conditions of speed and pressure calculated to break down the bearing.

In a series of tests on unheat-treated bearings, the average length of time at breakdown speed was 8 to 10 hours, and the untreated bearings showed considerable cracking of the lining, which had become separated from the steel shell in some areas. Heat-treated bearings subjected to the same test ran from 18 to 20 hours, and were found to be superior in appearance and condition due to the beneficial effects of the heat treatment as described.

*Summary*

Throughout all the various tests on the heat-treated and unheat-treated compositions mentioned, there has been definite data accumulated to indicate the superior bearing alloy structure and the bonding improvement of the heat-treated bearings.

From the above, it is evident that bearings having their wearing surfaces formed of lead base alloy and when subjected to the heat treatment above described have greatly improved physical characteristics over similar structures not so treated.

What I claim as my invention is:

1. In the manufacture of bearings comprising a reinforcing shell and a lining formed of a lead base alloy, the step of subjecting the bearing to heat-treatment in which a uniform temperature of from 300° to 350° F. is maintained for a period of from 3 to 20 hours and then gradually reduced to normal temperature.

2. In the manufacture of bearings comprising a reinforcing shell and a lining formed of a composition having from 1 to 15% tin, 5 to 20% antimony and the balance mainly of lead, the step of subjecting the bearing to heat-treatment in which a uniform temperature of from 300° to 350° F. is maintained for a period of from 3 to 20 hours and then gradually reduced to normal temperature.

3. In the manufacture of bearings comprising a reinforcing shell and a lining formed of a composition having from 1 to 15% tin, 5 to 20% antimony and the balance mainly of lead, the step of subjecting the bearing to heat-treatment in which a uniform temperature of approximately 350° F. is maintained for a period of from 3 to 6 hours and then gradually cooled.

4. In the manufacture of bearings comprising a reinforcing shell and a lining formed of a lead base alloy, the steps of placing the bearing in a non-oxidizing oil within a container, subjecting the container and its contents to a uniform temperature of approximately 350° F. for a period of from 3 to 6 hours and then permitting it to cool to normal temperature before removing the bearing.

5. In the manufacture of bearings comprising a reinforcing shell of steel and a lining of a composition having from 1 to 15% tin, 5 to 20% antimony and the balance mainly of lead, the step of subjecting the bearing to heat-treatment in which a uniform temperature of from 300° to 350° F. is maintained for a period of from 3 to 20 hours and then gradually reduced to normal temperature.

CHESTER C. MOFFATT.